United States Patent
Lee et al.

(10) Patent No.: US 8,761,716 B2
(45) Date of Patent: Jun. 24, 2014

(54) DEVICE AND METHOD FOR PROCESSING EMERGENCY CALL IN A PORTABLE TERMINAL

(75) Inventors: Shin-Duck Lee, Gyeongsangbuk-do (KR); Jong-Phil Lee, Daegu (KR); Hyun-Chul Lee, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 73 days.

(21) Appl. No.: 13/312,046

(22) Filed: Dec. 6, 2011

(65) Prior Publication Data
US 2012/0142308 A1    Jun. 7, 2012

(30) Foreign Application Priority Data
Dec. 6, 2010   (KR) .................... 10-2010-0123569

(51) Int. Cl.
*H04W 4/22*    (2009.01)

(52) U.S. Cl.
USPC .................................. 455/404.1; 455/412.1

(58) Field of Classification Search
USPC ......... 455/404.1, 411, 412.1, 416–418, 435.1
See application file for complete search history.

(56) References Cited

U.S. PATENT DOCUMENTS

2005/0090226 A1*  4/2005  Wolf ........................ 455/404.1
2012/0135715 A1*  5/2012  Kang et al. ................ 455/412.1

* cited by examiner

*Primary Examiner* — Sam Bhattacharya
(74) *Attorney, Agent, or Firm* — Cha & Reiter, LLC

(57) ABSTRACT

Disclosed is a device and a method for processing an emergency call in a portable terminal regardless of a SIM card activated by a user's selection. The device includes a plurality of SIM cards, and a controller to make a control so that a SIM card capable of performing a communication service is automatically switched and the emergency call is transmitted when an emergency call transmission is generated.

4 Claims, 2 Drawing Sheets

DEVICE AND METHOD FOR PROCESSING EMERGENCY CALL IN A PORTABLE TERMINAL

CLAIM OF PRIORITY

This application claims priority under 35 U.S.C. §119 to a Korean Patent Application entitled "Device and Method for Processing Emergency Call in Portable Terminal" filed in the Korean Intellectual Property Office on Dec. 6, 2010 and assigned Serial No. 10-2010-0123569, the contents of which are incorporated herein by reference.

BACKGROUND OF THE INVENTION

1. Field of the Invention

The present invention relates to a device and a method for processing an emergency call in a portable terminal.

2. Description of the Related Art

In general, a subscriber identification module (SIM) card provided in a portable terminal stores personal information so as to provide various services, such as subscriber identification, charging, and a security function. The SIM card has been developed so that a user can freely use the mobile communication with a user's own telephone number at any place regardless different mobile communication protocols, such as the CDMA (Code Division Multiple Access) scheme or the GSM (Global System for Mobile Communication) scheme. Among the SIM cards, a subscriber identification module of the UMTS (Universal Mobile Telecommunication System) in the $3^{rd}$ generation mobile communication is referred to as the USIM (Universal Subscribe Identity Module).

Such a SIM card can be manufactured in a form of a smart card and be inserted in a portable terminal to perform an initialization process including an identification process by verifying the subscriber information stored in the SIM card. Thus, the portable terminal can be used based on only the authenticated SIM card.

A portable terminal combined with a single SIM card is generally used. However, a portable terminal combined with dual SIM cards has been recently introduced. A dual SIM card terminal, it is possible to selectively switch the SIM card during operation, so that a user can use two telephone numbers with a single terminal.

However, when an emergency call is generated in a state where the SIM card, which has been selected by the user and activated, cannot perform the communication service, it is impossible to transmit an emergency call because the portable terminal can attempt to transmit the call only through the activated SIM card. The ability to place a call during an emergency situation without repeating the call attempts is important to reduce the potential impact that a delay can have in, for example, heart-related emergency since a caller may not be aware that the terminal is unable to place a call.

SUMMARY OF THE INVENTION

Accordingly, the present invention has been made to solve the above-stated problems occurring in the prior art and provides additional advantages, by providing a device and a method for processing an emergency call in a portable terminal, in which a SIM card capable of performing communication services is automatically switched and an emergency call is transmitted, regardless of a SIM card activated by a user's selection.

In accordance with an aspect of the present invention, a device for processing an emergency call in a portable terminal includes: a plurality of SIM cards; and a controller to make a control so that a SIM card capable of performing a communication service is automatically switched and the emergency call is transmitted when an emergency call transmission is generated.

In accordance with an aspect of the present invention, a method for processing an emergency call in a portable terminal includes: identifying a communication service state of an activated SIM card when a transmission of the emergency call is generated; and when the activated SIM card is in a communication service unavailable state, automatically switching to a different SIM card capable of performing a communication service and transmitting the emergency call.

Accordingly, the device and the method for processing the emergency call in the portable terminal of the present invention can effectively improve the performance of the emergency call transmission with an advantage of the portable terminal including the plural SIM cards.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Hereinafter, the first exemplary embodiments of the present invention will be described with reference to the accompanying drawings.

Figure 1:
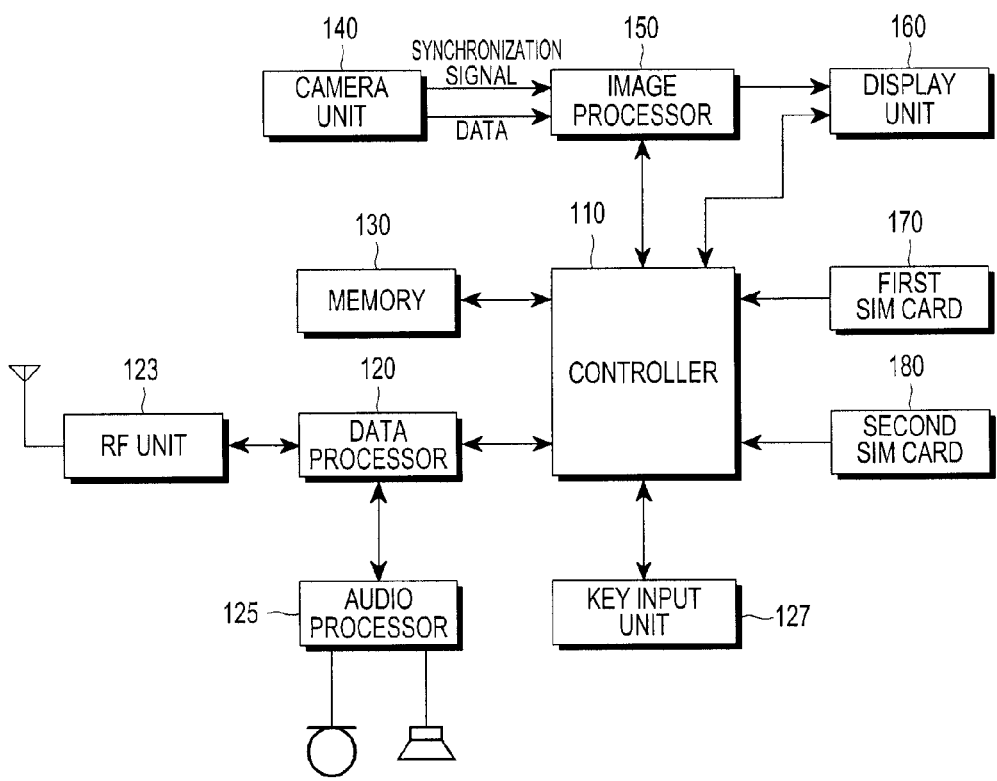
FIG. 1 is a diagram illustrating a portable terminal according to an exemplary embodiment of the present invention.

FIG. 1 is a diagram illustrating a portable terminal according to an exemplary embodiment of the present invention. As shown, a portable terminal includes two SIM cards, i.e. a first SIM card and a second SIM card for illustrative purposes, but it should be noted that two or more SIM cards can be applied according to the teachings of the present invention. Thus, the number of SIM cards provided in the terminal should not limit the scope of the invention.

Referring to FIG. 1, an RF unit 123 performs a wireless communication function of a portable terminal. The RF unit 123 includes an RF transmitter for up-converting and amplifying a frequency of a transmitted signal and an RF receiver for low-noise amplifying a received signal and down-converting a frequency. A data processor 120 includes a transmitter for encoding and modulating the transmitted signal and a receiver for demodulating and decoding the received signal. That is, the data processor 120 can be formed with a modem and a codec. Here, the codec includes a data codec for processing packet data, etc. and an audio codec for processing an audio signal, such as voice. An audio processor 125 reproduces a received audio signal output from the audio codec of the data processor 120 or transmits a transmitted audio signal generated in a microphone to the audio codec of the data processor 120.

A key input unit 127 includes keys for inputting numbers and character information and functional keys for setting various functions.

A memory 130 can be formed with a program memory and a data memory. The program memory can store programs for controlling the general operations of the portable terminal and programs for making a control so that it is possible to switch to a SIM card capable of performing the communication service and transmit an emergency call when transmitting the emergency call.

A controller 110 performs the general operations of the portable terminal. In operation, when the transmission of the emergency call, for example 911 emergency call, is generated by a user, the controller 110 makes a control so that a SIM card capable of performing the communication service is automatically switched and the emergency call is transmitted. For example, when a first SIM card 170 activated by a selection of the user is in a state of the communication service incapability, the controller 110 makes a control so that the first SIM card 170 is automatically switched to a second SIM card 180 capable of performing the communication service and thus the emergency call can be transmitted through the second SIM card 180. Similarly, when the second SIM card 180 activated by a selection of the user is in a state of the communication service incapability, the controller 110 makes a control so that the second SIM card 180 is automatically switched to the first SIM card 170 capable of performing the communication service so that the emergency call can be transmitted through the first SIM card 170.

A camera unit 140 photographs image data, and includes a camera sensor for converting a photographed optical signal to an electric signal and a signal processor for converting an analogue image signal photographed from the camera sensor to digital data. Here, it is assumed that the camera sensor is a CCD sensor or a CMOS sensor, and the signal processor can be implemented in a Digital Signal Processor (DSP). Further, the camera sensor can be integrally or separately formed with the signal processor.

An image processor 150 performs an Image Signal Processing (ISP) for displaying an image signal output from the camera unit 140 on a display unit 160. The ISP performs a function, such as a gamma correction, an interpolation, a spatial change, an image effect, an image scale, Auto White Balance (AWB), Auto Exposure (AE), and Auto Focus (AF). Therefore, the image processor 150 processes an image signal output from the camera unit 140 frame by frame, and outputs the frame image data in accordance with a characteristic and a size of the display unit 160. Further, the image processor unit 150 includes an image codec, and compresses the frame image data displayed on the display unit 160 in a preset scheme or restores the compressed frame image data to the original frame image data. Here, the image codec may include a JPEG codec, an MPEG4 codec, a Wavelet codec, etc. The image processor 150 is assumed to have an On Screen Display (OSD) function and can output OSD data in accordance with a screen size displayed under the control of the controller 110.

The display unit 160 displays an image signal output from the image processor 150 on a screen and displays user data output from the controller 110. Here, the display unit 160 can be an LCD, and in this case, the display unit 160 can include an LCD controller, a memory capable of storing image data, and an LCD display device. Here, if the LCD is implemented in a touch screen scheme, the LCD can function as an input unit. In this regard, the display unit 160 can display keys, such as the keys included in the input unit 127.

Hereinafter, an operation of processing an emergency call in the above portable terminal will be described with reference to FIG. 2 in detail.

Figure 2:
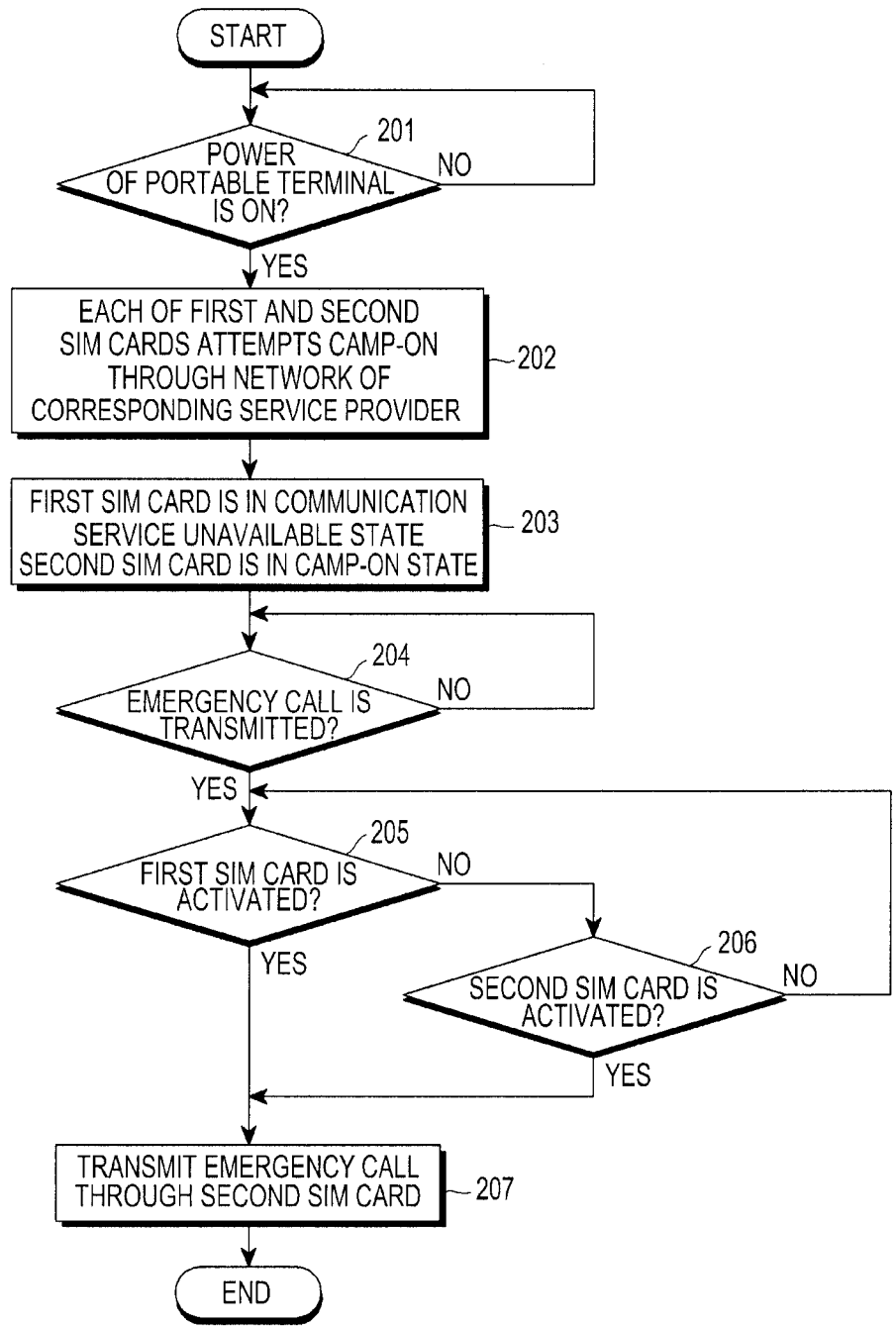
FIG. 2 is a flowchart illustrating a process of processing an emergency call in a portable terminal according to an exemplary embodiment of the present invention.

FIG. 2 is a flowchart illustrating a process of processing an emergency call in the portable terminal according to an exemplary embodiment of the present invention.

Referring to FIG. 2, when a power of the portable terminal turns on, the controller 110 detects the turn-on state of the portable terminal in step 201, and makes a control so that each of the first SIM card 170 and the second SIM card 180 attempts a camp-on, which is a communication service available state, through a network of a service provider issuing a corresponding SIM card, in step 202.

Thereafter, the first SIM card 170 may be in a state of the communication service unavailability and the second SIM card 180 may be in a state of the camp-on capable of performing the communication service, or the second SIM card 180 may be in a state of the communication service unavailability and the first SIM card 170 may be in a state of the camp-on capable of performing the communication service.

When the user attempts to transmit an emergency call in step 203 in which the first SIM card 170 is in a state of the communication service unavailability and the second SIM card 180 is in a state of the camp-on capable of performing the communication service, the controller 110 detects the attempt of the emergency call transmission and identifies that SIM card activated through the selection of the user in step 204. In the present invention, when a power of the portable terminal turns on, the controller of the portable terminal makes the control so that each of two SIM cards attempts a camp-on for one or more frequencies meeting a certain reception signal strength for a service. According to the result, the controller determines that the communication is possible regarding which SIM card in a state of the camp-on.

Thus, the controller determines whether the communication of the corresponding SIM card is possible or not, according to the success or failure of the camp-on of the corresponding SIM card.

If, the camp-on attempt of the corresponding SIM card is success, the controller determines the possibility of the communication according to the camp-on success of the corresponding SIM card through the alarm such as the message informing the camp-on success notification received from the corresponding network.

That is, when the first SIM card 170 is in a state of the activation by the selection of the user, the controller 110 detects the activation of the first SIM card 170 in step 205. The controller 110 switches the first SIM card 170 to the second SIM card 180, which has not been activated, but is in the camp-on state capable of performing the communication service, activates the second SIM card 180, then transmits the emergency call through the second SIM card 180 in step 207. However, when the second SIM card 180 is in a state of the activation by the selection of the user, the controller 110 detects the activation of the second SIM card 180 in step 206 and transmits the emergency call through the second SIM card 180, which is in the camp-on state capable of performing the communication service, in step 207.

Alternatively, when the user attempts to transmit an emergency call in a state where the second SIM card 180 is in a state of the communication service unavailability and the first SIM card 170 is in a state of the camp-on capable of performing the communication service, the controller 110 detects the attempt of the emergency call transmission and identifies the SIM card activated through the selection of the user.

When the second SIM card 180 is in a state of the activation, the controller 110 detects the activation of the second SIM card 180 in step 205. Then, the controller 110 switches the second SIM card 180 to the first SIM card 170, which has not been activated, but is in the camp-on state capable of performing the communication service, and activates the first SIM card 170, then transmits the emergency call through the first SIM card 170. However, when the first SIM card 170 is in a state of the activation by the selection of the user, the controller 110 detects the activation of the first SIM card 170 and transmits the emergency call through the first SIM card 170 which is in the camp-on state capable of performing the communication service.

In FIG. 2, the operation of the transmission of the emergency call in the portable terminal including the first SIM card and the second SIM card has been exemplified for description. However, when the SIM card activated by the selection of the user is in the communication unavailable state, a portable terminal including two or more SIM cards also can identically perform the automatic switching to a different communication available SIM card as described above, then activate the switched SIM card for transmission of the emergency call.

Note that the above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the present invention has been shown and described with reference to certain exemplary embodiments and drawings thereof, it will be understood by those skilled in the art that various changes in form and details may be made therein without departing from the spirit and scope of the invention as defined by the appended claims.

What is claimed is:

1. A device for processing an emergency call in a portable terminal, comprising:
    a plurality of SIM cards; and
    a controller configured to detect a generation of an emergency call and for determining whether a currently activated first SIM card of the plurality of SIM cards is camped-on to a network and capable to making the emergency call, and to control transmitting the emergency call by the first SIM card when the first SIM card is camped-on to the network, and to control an automatic switch from the currently active first SIM card to a second SIM card that is camped-on to the network without unregistering the first SIM card and registering the second SIM card and activates the second SIM card camped-on to the network so that the emergency call is transmitted when the first SIM card cannot process the emergency call, and
    wherein the controller determines whether the second SIM card is capable of performing a communication service of the plurality of SIM cards based on a camped-on state to automatically switch to the second SIM card so that the emergency call is transmitted.

2. The device as claimed in claim 1, wherein when the first SIM card activated among the plurality of SIM cards is in a communication service unavailable state, the controller makes a control so a second SIM card capable of performing the communication service is activated so that the emergency call is transmitted through the second SIM card.

3. The device as claimed in claim 1, wherein when the second SIM card is activated among the plurality of SIM cards is in a communication service unavailable state, the controller controls the first SIM card to perform communication service so that the emergency call is transmitted through the first SIM card.

4. A method for processing an emergency call in a portable terminal, the method comprising:
    identifying whether a first SIM card camped on a network is capable of performing a communication service of a plurality of SIM cards when a transmission of the emergency call is generated;
    transmitting the emergency call by the first SIM card when the first SIM card is camped-on to the network, and when the first SIM card is in a communication service unavailable state based on not being camped-on to the network, automatically switching to a second SIM card for transmission of the emergency call without unregistering the first SIM card and registering the second SIM card, in which the controller determined the second SIM card is capable of performing a communication service based on being camped-on to the network;
    and
    transmitting the emergency call using the second SIM card capable of performing a communication service.

* * * * *